July 7, 1953  E. V. BENNETT ET AL  2,644,495
ROUTING MACHINE FOR REMOVING DEFECTS FROM WOOD
Filed Aug. 30, 1950  3 Sheets-Sheet 1

INVENTORS
ELBERT V. BENNETT
HARRELL RENN
BY
Cook and Schermerhorn
ATTORNEYS

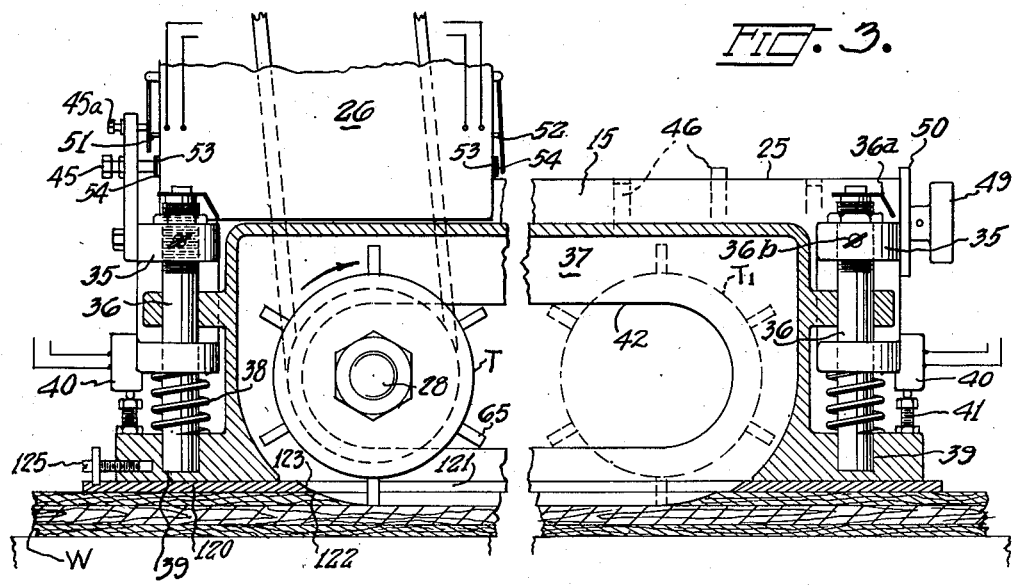
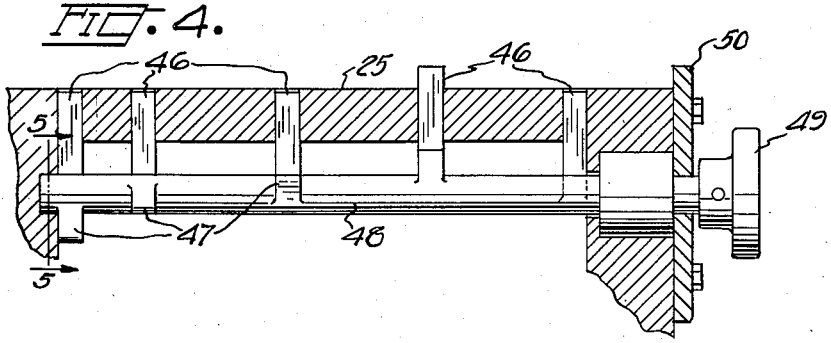
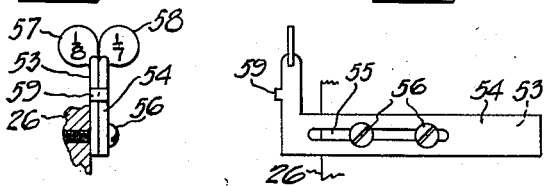
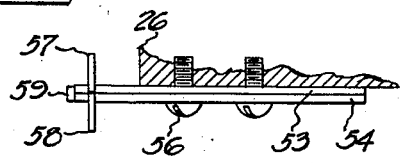

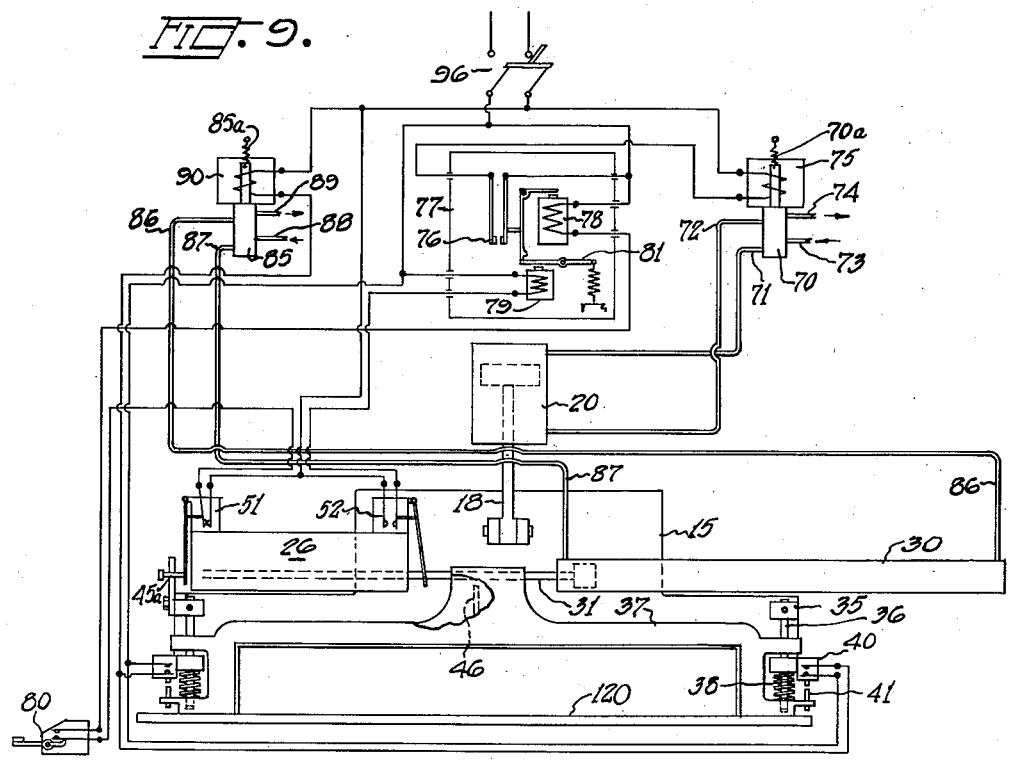
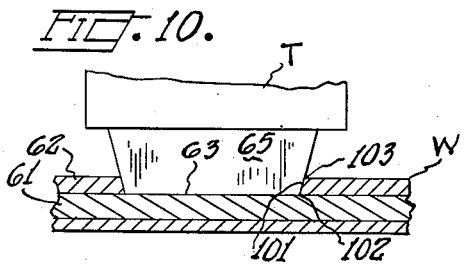
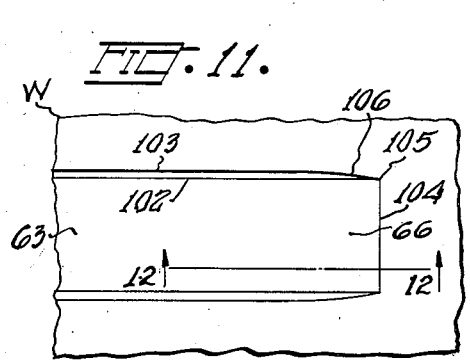
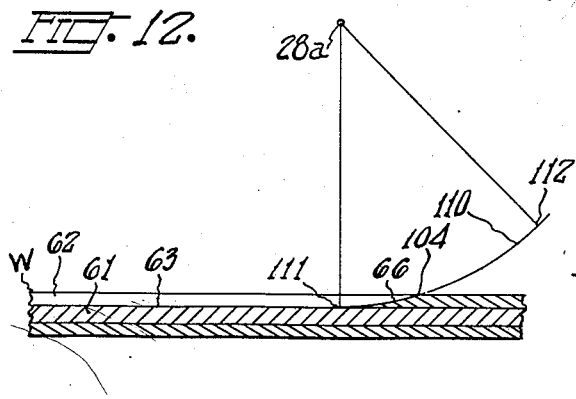

Patented July 7, 1953

2,644,495

UNITED STATES PATENT OFFICE 2,644,495

ROUTING MACHINE FOR REMOVING DEFECTS FROM WOOD

Elbert V. Bennett and Harrell Renn, Albany, Oreg., assignors to M and M Wood Working Company, Portland, Oreg., a corporation of Oregon Application August 30, 1950, Serial No. 182,285

19 Claims. (Cl. 144—136)

This invention relates to an improved routing machine for removing defects from wood in preparation for patching.

It is the custom to improve the grade of veneer, plywood and lumber by routing out small knots, pitch pockets, checks, and the like, to form a shallow recess of some standard shape for receiving a wood veneer patch to cover the defect. Such repair patches have heretofore generally been circular, boat-shaped or elongated patches with rounded ends, the patch in each case having a peripheral edge joint surface not substantially wider than the thickness of the patch. Patches of these shapes have been widely used, notwithstanding their numerous disadvantages. They are wasteful of the high grade patching veneer, in most cases they are difficult to cut to exact size to fit tightly in a prepared recess in the wood, and they include a considerable extent of end grain glue bond in the edge joint which is relatively weaker than an edge grain bond or a flat grain bond.

The general object of the present invention is to provide a routing machine for preparing a recess to receive a patch of improved shape which is not subject to the foregoing disadvantages and shortcomings. A primary object is to provide a routing machine to form a recess shaped to receive a rectangular sled-shaped patch. Other objects are to cut a defect removal recess of a shape to eliminate end grain joint surfaces, to provide a shape of recess having all the joint surfaces around the edges of the patch either predominantly edge grain surfaces or predominantly flat grain surfaces, and to provide an efficient and precise semi-automatic mechanism to prepare recesses of uniform length to fit sled patches of different thickness.

The apparatus of the invention comprises a rotary rounting tool mounted on a horizontal shaft for traverse in the plane of rotation of the tool to cut an elongated rectangular groove of uniform width with end portions of gradually decreasing depth to fit a sled-shaped patch. The cutter is mounted for vertical movement toward and away from the work, and is traversed between retractible stops to cut a predetermined length of groove. Automatic, electrically and fluid pressure operated mechanism controls the vertical and horizontal movements of the tool to perform the cycle of operation necessary for cutting such a groove in response to the closing of a manual switch. Patches of different thickness having the same length require a different distance of horizontal traverse of the routing tool, and a novel com- pensating adjustment is provided to vary the length of traverse for patches of different thickness.

Other features and advantages will be appreciated from the following description of a preferred embodiment of the machine illustrated on the accompanying drawings. The drawings are intended, however, for the purpose of illustrating the invention, and not for the purpose of limiting the invention, as various changes may be made in the construction and arrangement of parts and certain features may be used without others. All such modifications within the scope of the appended claims are included in the invention.

In the drawings:

Figure 3 is a side elevation view of the cutter head with parts in section;

Figure 4 is an enlarged sectional view of the stop mechanism for regulating the horizontal travel of the cutting tool;

Figure 5 is a cross sectional view, taken on the line 5—5 of Figure 4;

Figure 6 is a view of the adjusting shims for the carriage;

Figure 7 is a top plan view of the shims;

Figure 8 is an end view of the shims looking at the front of the machine;

Figure 9 is a schematic view illustrating the electrical and fluid pressure systems of the machine;

Figure 10 is a sectional view taken transversely of the recess, showing the shape of the recess and the blades of the routing tool;

Figure 11 is a fragmentary plan view of the recess; and

Figure 12 is a sectional view taken on the line 12—12 of Figure 11.

Figure 1:
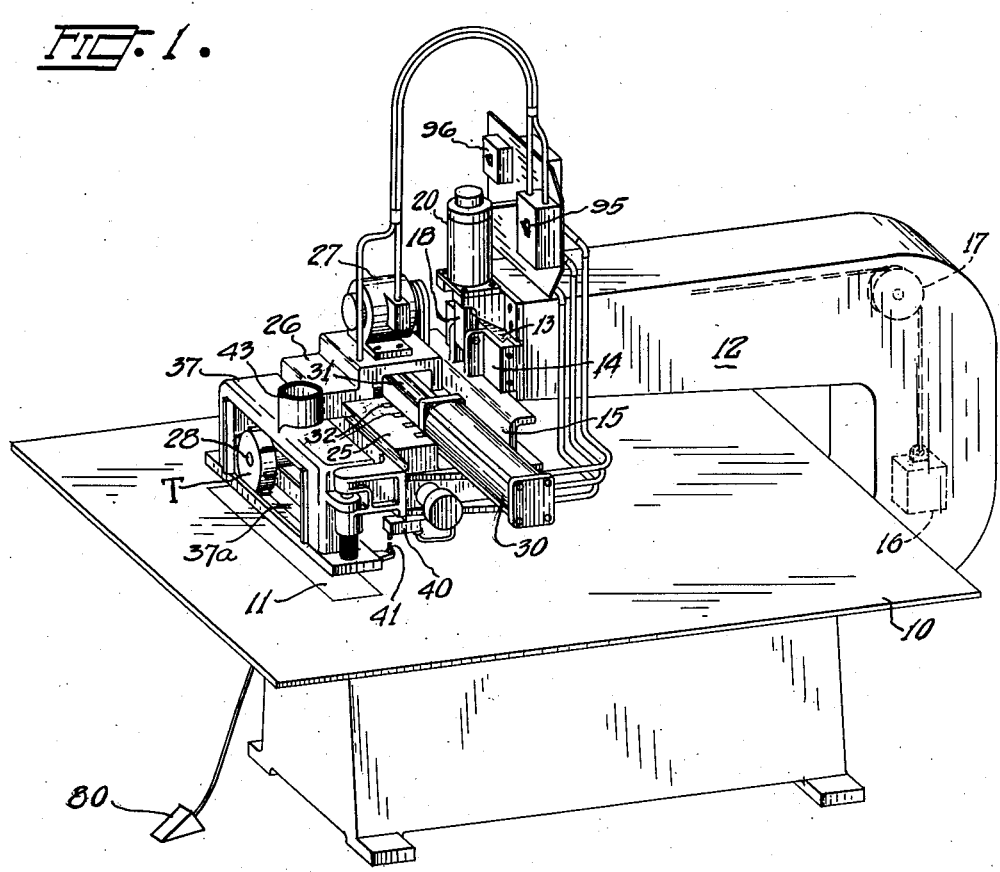
Figure 1 is a general perspective view of the routing machine of the invention.

Referring first to Figure 1, the numeral 10 designates a flat table for supporting the wood to be patched. The routing tool T is mounted for traverse above a wooden insert 11 in the table top to prevent damage to the tool in case it should be lowered into engagement with the table. The direction of the grain of the wood to be repaired is aligned with the insert 11, so that the recess, or groove, formed by the tool T will extend longitudinally of the grain. A rigid, hollow arm 12 overhangs the table 10 to support the tool T conveniently for positioning large plywood panels and the like in different positions to place variously located defects in the panel directly under the tool T. The arm 12 carries a vertical guide 13 for a slide 14 which supports most of the operating mechanism associated with the tool T on a frame 15 which is integral with the slide. The weight of these vertically movable parts is counterbalanced by a weight 16 suspended from a cable 17 trained over suitable pulleys within the arm 12. Frame 15 is raised and lowered by means of a link 18 connected with a piston rod and piston in vertical cylinder 20 which is mounted on the end of arm 12.

The frame 15 is equipped with a horizontal way or guide 25 for a carriage 26 carrying the cutter T and its driving motor 27. Motor 27 is mounted on top of the carriage 26, and the shaft 28 of cutter T is mounted in suitable bearings on the under side of the carriage, the motor being belted directly to a pulley on one end of the shaft. Also mounted on the frame 15 is a cylinder 30 having a piston rod 31 connected with the carriage 26. Numeral 32 designates openings in the way or guide 25 through which stops may be projected upwardly to limit the travel of the carriage.

Referring now more particularly to Figure 3, the frame 15 is equipped with ears 35 for mounting a pair of guide studs 36 for a floating guard housing 37 surrounding the cutting tool T. Springs 38 urge this housing downwardly relative to the frame 15 to project below the tool when the frame is raised. When the frame 15 is lowered, the bottom of housing 37 engages the top of work piece W, allowing the frame to descend until studs 36 strike the bottoms of holes 39 in housing 37. The upper ends of studs 36 have threaded engagement with the top ears 35 to adjust the depth of cut and are equipped with calibrated dial and pointer means 36a to facilitate this adjustment. Ears 35 have lock screws 36b to hold the adjustment after it is set.

Frame 15 carries two switches 40 which are closed by adjustable switch actuating screws 41 on the housing 37 after the housing engages the work piece and the springs 38 are compressed by the continued downward movement of frame 15 at the beginning of a routing operation. When frame 15 is lifted at the completion of the routing operation, the expansion of springs 38 moves the housing 37 downward relative to the frame in the manner above described to reopen the switches 40. The switches are normally open when they are not engaged by the actuating screws 41.

Housing 37 is equipped with a transparent panel 37a in its front side for observation of the routing operation, and has a horizontal slot 42 in its back side to accommodate the movement of shaft 28 to carry the tool from a left position indicated at T in Figure 3 to a right position T' and back again. This slot also serves as an air inlet to carry chips from the routing operation into the suction hose connection indicated at 43 in Figure 1.

Bolted on the bottom of housing 37 is a fiber chip breaker throat plate 120 which is pressed firmly against the work surface during a routing operation. Plate 120 has an elongated opening 121 to accommodate the traverse movement of the tool. Opening 121 terminates at its left end at an edge 122 on an arcuate surface 123 having the same radius as the cutter blades. Screw 125 provides longitudinal adjustment for plate 120 to position the edge 122 as close to the cutter blades as possible so the wood will not be splintered at the end of the groove where the cutters rotate upwardly.

The left-hand position of carriage 26 is determined by an adjustable stop 45 on the frame 15, shown in Figure 3. In order to cut grooves of a predetermined length, a selected one of a plurality of stops 46 is raised into the path of movement of carriage 26 by cams 47 on a cam shaft 48 journaled in frame 15. Cam shaft 48 is turned to different positions by handle 49. Plate 50 forms an end stop to limit the maximum travel of the carriage.

The stops 45, 46 and 50 provide definite limits of travel for the carriage 26 for precise gauging of the length of the recess cut in the work piece. Stop screw 45a and stops 46 and 50 operate a pair of limit switches 51 and 52 for producing the necessary control functions for an automatic cycle of operations. When carriage 26 moves to the left, stop 45 engages the operator of switch 51 a short distance before the motion of the carriage is arrested by the stop, in order to close this switch approximately at the limit of movement. Similarly, in the case of switch 52, whichever one of stops 46 is raised will engage the operator of this switch just before the motion of the carriage is arrested by the stop, so that the switch will be closed when the limit of movement is reached. Stops 46 may be positioned on the shaft 48 at two-inch intervals, and at the proper distances from stop 45 to prepare recesses two, four, six, eight, etc., inches in length up to the capacity of the machine.

A pair of retractible sliding shims 53 and 54 is mounted on one end of carriage 26 to engage the stop 45, and a similar pair of shims is mounted on the other end of the carriage to engage whichever one of the stops 46 or 50 is being used. The shims are slotted at 55 for sliding movement on a pair of screws 56, as shown in Figures 6 to 8. In the present illustration, shim 53 is equipped with a finger piece 57 bearing the designation ⅛, and shim 54 is equipped with a finger piece 58 bearing the designation ¼. The arrangement is such that both shims may be pulled out to avoid engagement with the stops 45, 46 and 50 which, in the illustrated embodiment, would be the normal position when preparing recesses for patches of $\frac{3}{32}''$ veneer. For ⅛'' veneer patches, the two shims 53 are pushed in, and for ¼'' veneer patches, all four shims are pushed into operative position. A lug 59 on each shim 54 insures that the companion shim 53 will always be pushed in when shim 54 is pushed in. The thickness of the shims introduced at both ends of the carriage effects the necessary adjustment of the length of carriage traverse in order to cut a predetermined length of groove for patches of different thickness. The shims are not of sufficient thickness to affect the described operation of limit switches 51 and 52.

Figure 2:
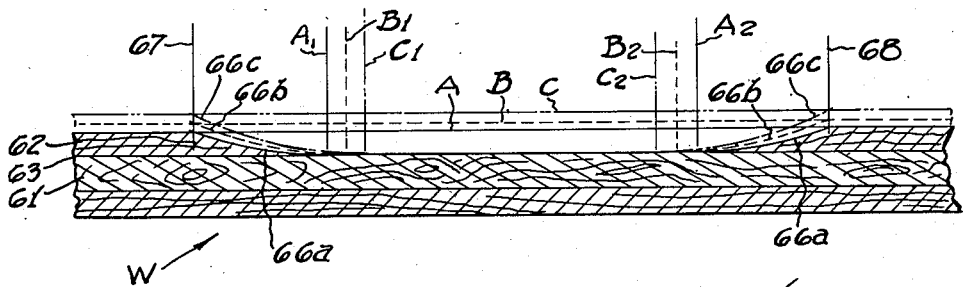
Figure 2 is a longitudinal sectional view through a recess formed by the machine in a piece of plywood illustrating the need for adjustment of the length of traverse of the routing tool to fit patches of different thickness having the same length.

The purpose of the small traverse adjustment just described is explained with reference to Figure 2. The wood W to be repaired in this case is a plywood panel having a core veneer 61 and a face veneer 62 with a joint or glue line 63 therebetween. In removing a defect from the face veneer 62, it is generally preferred to rout out the wood down to the glue line 63 on the surface of the core veneer to receive a patch of the same thickness as the face veneer. The tool T has radial cutting blades 65 which leave arcuate end surfaces 66a at the ends of the groove when the tool is moved parallel with the wood surface by traversing carriage 26, with blades removing wood down to the glue line 63. Vertical lines 67 and 68 are dimension lines to indicate a length of recess corresponding to a predetermined length of sled patch, such as, for example, two inches. These lines are drawn to the point of intersection of curved end surfaces 66a with the top surface A of face veneer 62. In making a recess of this indicated length, the axis of the tool is lowered on line $A^1$ to make its initial cut, and then traversed to the right until its axis reaches line $A^2$, in which position the tool will cut the other arcuate end surface 66a.

Using the glue line 63 as a reference level for the bottom of the patch, it will be apparent that thicker face veneers would have longer arcuate end surfaces in the recesses which would make the recesses longer between the lines 67 and 68 if the tool travel were not shortened to compensate. Thus, if the surface of the face veneer falls on the line B, the tool must begin its cut with its axis on the line $B^1$ and end its cut with its axis on the line $B^2$ in order to cut the end curves 66b intersecting the line B at the lines 67 and 68. If the face veneer is still thicker, as indicated by the line C, the travel must be further reduced to equal the distance from $C^1$ to $C^2$, to cut the end surfaces 66c. The thickness of the shims 53 and 54 introduced at both ends of carriage 26 compensate for the necessary adjustment of carriage traverse for the usual range of commercial thickness of face veneers, and the fact that shims are introduced at both ends of the carriage at the same time insures that the chip-breaker plate 120 is in its proper position relative to the cutter on all depths of cuts. When all the shims are retracted, the carriage traverse extends the distance between vertical lines $A^1$ and $A^2$ in Figure 2. When shims 53 are pushed in, the carriage moves the shorter distance from $B^1$ to $B^2$. When all the shims are pushed into operative position the travel is limited to the distance between $C^1$ and $C^2$.

Shims 53 and 54 are calibrated in reference to veneer thicknesses and bear suitable indicia, as illustrated, to designate patches of different standard thicknesses. In patching lumber, any thickness of patch may be used, but shims 53 and 54 must be set to correspond with the patch thickness in order to make the recess the same length as the patch. With the proper use of the adjustment just described, the sled patches may be cut precisely to certain standard lengths, such as two, four, six and eight inches, in all the different thicknesses of veneer used for patching. The depth of cut adjustment indicated at 36a is the distance the cutter T protrudes below the chip breaker plate 120 and determines the shim adjustment just described.

Figure 9 illustrates the control system for producing an automatic cycle of operations to move the tool vertically and horizontally in cutting out a defect. Vertical cylinder 20 is connected with a four-way balanced piston solenoid operated reversing air valve 70 by means of pipes 71 and 72 at opposite ends of the cylinder. Numerals 73 and 74 designate fluid pressure and relief lines connected with the reversing valve. Valve 70 is held normally in its "up" position by an internal spring indicated schematically at 70a to connect pressure line 73 with pipe 72 and relief line 74 with pipe 71. The movable valve member in reversing valve 70 is connected with an armature in a solenoid coil 75 which, when energized, moves the valve to its "down" position, connecting pressure line 73 with pipe 71 and connecting relief line 74 with pipe 72.

Solenoid 75 is energized by the closing of switch contacts 76 in a lock-up relay 77. Switch 76 is closed by the action of a solenoid 78 when the latter is energized by the completion of a circuit through treadle switch 80 and left traverse switch 51. Switch 76 is held closed by a spring latch 81. This latch is tripped to open switch 76 by the action of coil 79 when the latter is energized by the closing of right traverse switch 52.

The opposite ends of horizontal cylinder 30 are connected with a solenoid operated reversing valve 85 by a pair of pipes 86 and 87. This reversing valve is connected with fluid pressure and relief lines 88 and 89 and contains a four-way balanced piston valve member connected with an armature in solenoid 90. The valve member is normally held in its "left" position (up in Figure 9) by spring 85a to connect pressure line 88 with pipe 86 and relief line 89 with pipe 87. When the solenoid is energized, the valve member is moved to its "right" position (down in Figure 9), connecting pressure line 88 with pipe 87 and relief line 89 with pipe 86. Solenoid 90 is energized by the closing of either one of the parallel switches 40. Switch 95 in Figure 1 controls the motor 27, and switch 96 is a main switch for the system in Figure 9.

*Operation*

The normal rest position of the parts is indicated in Figure 9 wherein frame 15 is held in its upper limit position and carriage 26 is traversed to its left-hand limit position against stop 45. Switch 51 is thereby held closed while the lock-up relay switch 76 and foot treadle switch 80 are open. Solenoids 75 and 90 are de-energized and the movable valve members in the reversing valves 70 and 85 are held in their "up" and "left" positions (both up in Figure 9), respectively, by the valve springs.

To start operation, treadle switch 80 is closed. This completes a circuit through switch 51 and coil 78 of the lock-up relay 77 to close its switch contacts 76. The relay is locked in this position by spring actuated latch 81. Switch contacts 76 then complete a circuit through coil 75 operating the solenoid valve 70 to "down" position, connecting fluid pressure from pressure line 73 to pipe 71 and connecting pipe 72 to relief line 74, causing piston 20 to move the carriage 15 down.

When the chip breaker shoe 120 on the bottom of housing 37 rests upon the top of the workpiece, springs 38 are compressed, causing actuating screws 41 to close one or both of the switches 40. The switches 40 complete a circuit through coil 90, shifting the reversing valve 85 to its "right" position, admitting pressure from line 88 to pipe 87 and connecting relief line 89 with pipe 86. Piston 30 then moves to the right to produce right traverse of carriage 26. When right traverse switch 52 is closed by engagement with one of the stops 46 or 50, a circuit is completed through coil 79, tripping the latch 81 of lock-up relay 77 and unlocking it, allowing the switch contacts 76 to open. This opens the circuit through solenoid coil 75, allowing valve 70 to return by spring action to its "up" position to admit fluid pressure to the bottom end of cylinder 20 to raise the frame 15.

Upward movement of frame 15 allows switches 49 to open, breaking the circuit through solenoid 90 and allowing reversing valve 85 to return to its normal "left" position (up in Figure 9) by spring action. By this action, pressure is admitted to pipe 86 to move the piston in cylinder 30 to the left to return the carriage to its starting position. The return traverse of the carriage opens switch 52 and closes switch 51, restoring all parts to their rest position shown in Figure 9 in readiness for the next cycle of operation.

Characteristics of the sled patch repair

Further characteristics of the groove or recess cut in the work-piece by the tool T are illustrated in Figures 10 to 12. The blades 65 have sloping side edges to cut sloping walls 101 on opposite sides of the defect removal recess. Each side wall 101 intersects the bottom surface 63 of the recess in a line 102 and the top surface of the face veneer in a line 103. Lines 102 are straight throughout the entire length of the recess and follow up the curve of the arcuate end surface 66 to intersect the end line 104 at the points 105. The top edge lines 103, however, are straight only where the recess is of uniform depth. At the ends of the patch the lines 103 converge toward the lines 102 to meet the end lines 104 at the same points 105. The sled patches, however, are rectangular and have top surfaces of uniform width equal to the distance between the parallel portions of lines 103. Thus, the ends of the patch are slightly compressed and crowded into the narrower width of the end line 104 to make an especially tight fit at the ends. Under the action of the necessary heat and pressure for setting the glue on the joint surfaces of the patch, the relatively thin wood at the sled ends of the patch adjusts itself, and by its compression establishes an especially good bond at the ends of the patch.

Figure 12 illustrates the nature of the grain structure for obtaining a strong glue bond on the curved end surfaces 66. Point 28a represents the position of the axis of cutter shaft 28 at a distance equal to many times the thickness of face veneer 62 from the flat bottom surface 63 of the routed recess. The arc 110 is described by the ends of the blades 65, and is tangent to the surface 63 at the point 111. Point 112 is 45 degrees distant from point 111, and represents the point at which the end grain and flat grain components would be equal if the recess were of considerably greater depth. As long as point 104, which represents the end of the recess, lies below point 112, it is apparent that the maximum end grain component in surface 66 is considerably less than the flat grain component. The usual thickness of plywood face veneers, and also the veneer used for patching, ranges between 1/16 inch and 1/7 inch, whereas the radius of the cutter is preferably about two inches, whereby it will be appreciated that the patch would have to be exceedingly thick and the recess correspondingly deep before point 104 would approach even close to point 112 on the arc 110. The sloping end surface 66 is, accordingly, described as having predominantly flat grain characteristics, it being recognized in the art that a flat grain surface makes the strongest glue bond and an end grain surface the weakest glue bond. The sled patch recess presents three types of bonding surfaces, the surface 63 being entirely a flat grain surface, the lateral edge surfaces 101 being predominantly edge grain surfaces with a small flat grain component, and the end surfaces 66 being predominantly flat grain surfaces with a small end grain component. There are no predominantly end grain joint surfaces whatever, whereas in the conventional forms of patches and recesses there are usually end grain joint surfaces of considerable peripheral extent around the margin of the patch.

It will be appreciated that a single sheet of veneer may be prepared in the same manner to receive a sled patch having the same thickness as the veneer. Surface 66 then breaks through the bottom surface of the veneer at point 111 in Figure 10 and there is no surface 63. The patch is secured in the veneer by glue bonds on the two side edge surfaces 101 and the two end edge surfaces 66, the latter having a large joint area relative to the cross sectional, or projected, area of the patch.

Having now described our invention and in what manner the same may be used, what we claim as new and desire to protect by Letters Patent is:

1. In a routing machine for removing defects from wood, a table for supporting the wood to be treated, a vertical guide above said table, a slide having a frame mounted for vertical movement on said guide, fluid pressure operated means for raising and lowering said frame, a horizontal guide on said frame, a carriage mounted for traverse movement on said guide, fluid pressure operated means on said frame for traversing said carriage, a horizontal shaft mounted transversely on said carriage, a rotary cutter on said shaft, and tapered blades on said cutter having straight ends parallel with said shaft for cutting an elongated sloping walled and flat bottom recess in said wood by traverse movement of said carriage when the cutter is lowered into engagement with the wood.

2. In a rotating machine for removing defects from wood, a rotary cutter mounted on an axis parallel with the surface of the wood to be treated for traverse in the plane of the cutter, stop means for limiting the traverse movement of said cutter to make a groove of predetermined length at a predetermined depth, and a compensating adjustment means cooperating with said stop means calibrated in terms of depth of cut to shorten the length of traverse a predetermined increment for a predetermined increase in the depth of cut to maintain said predetermined length of groove at different depths of cut.

3. In a routing machine for removing defects from wood, a routing tool mounted for vertical movement and horizontal traverse for cutting a groove in the surface of the wood to be treated, means for lowering the tool into engagement with the wood, means actuated by said lowering of the tool to traverse the tool to cut said groove, means actuated by said traverse movement to raise the tool, and means actuated by the upward movement of the tool for traversing the tool back to its starting position.

4. In a routing machine for removing defects from wood, a vertically movable frame, a carriage mounted for horizontal traverse on said frame, a routing tool on said carriage to cut a groove in the surface of the wood to be treated, and electrically controlled fluid pressure operated means for raising and lowering said frame and traversing said carriage comprising a manual switch for lowering said frame, a switch operated by engagement of the frame with the wood to start the traverse of said carriage in one direction, a limit switch actuated by said traverse movement to raise said frame, and means actuated by said upward movement to reverse the traverse movement of said carriage.

5. In a routing machine for removing defects from wood, a frame mounted for vertical movement above the surface of the wood to be treated, a routing tool mounted for horizontal traverse on said frame to cut a groove in said surface of the wood, a guard enclosing said tool and adapted to engage said surface of the wood when the tool is lowered to working position, a vertical lost motion connection between said guard and said frame, and a switch operated by relative movement between said guard and frame when said guard engages the wood to initiate the traverse movement of the tool.

6. In a routing machine for removing defects from wood, a routing tool mounted for vertical movement and horizontal traverse, a suction housing enclosing said tool and mounted for vertical movement relative to the tool, and means actuated by said relative movement to traverse the tool in response to engagement of said housing with a workpiece under treatment.

7. In a routing machine for removing defects from wood, a frame mounted for vertical movement, a routing tool mounted on said frame, a guard housing for the routing tool adapted to engage the surface of the work to be treated, vertical guide means for mounting said housing on said frame for relative vertical movement, and adjustable stop means for limiting said relative movement to control the depth of cut of said tool in the workpiece.

8. In a routing machine for removing defects from wood, a frame mounted for vertical movement, a routing tool mounted for horizontal traverse in said frame, a suction housing for said tool adapted to engage the surface of the work to be treated, vertical guide means on said frame for mounting said housing for relative vertical movement on said frame, adjustable stop means on said guide means to limit said relative vertical movement for controlling the depth of cut of said tool, and means actuated by said relative vertical movement to initiate said horizontal traverse of the tool when said housing engages the work surface.

9. In a routing machine for removing defects from wood, a frame mounted for vertical movement, a routing tool mounted for horizontal traverse in said frame, a guard housing for said tool having vertical movement relative to said frame, vertical guide studs for said housing having stop means to limit said relative movement, and vertical adjustment means for said studs.

10. In a routing machine for removing defects from wood, a rotary cutter mounted on a shaft parallel with the work surface for traverse parallel with said surface, a suction housing enclosing said tool and mounted for vertical movement relative to the tool, a horizontal slot in said housing to accommodate traverse of said shaft and provide an air intake for chip removal, a chip breaker plate on the bottom of said housing adapted to engage the work surface closely adjament said tool to prevent splintering of the wood, and means for adjusting one traverse limit position of said tool relative to said housing to maintain close working clearance between said tool and said plate for different depths of cut.

11. In a routing machine for removing defects from wood, means having traverse movement for cutting an elongated defect removal groove with sloping ends, adjustable stop means for controlling the depth of the groove, adjustable stop means for said traverse movement means to control the length of the groove, and compensating adjustment means for said last stop means calibrated in reference to said depth stop means to vary the length of traverse movement an amount equal to the variation in length of said sloping ends at different depths of groove for making grooves of different depths the same length.

12. A routing machine for removing defects from wood, comprising a table to support sheets of wood to be treated, a rotary routing tool having a horizontal axis for cutting elongated sloping-end grooves in said sheets, means supporting said tool above said table for movement between an upper position and a lower, defect-cutting position, adjustable stop means for limiting said movement to said lower position to cut grooves of different predetermined depths in said sheets, a pair of traverse stops, means for imparting traverse movement to said tool in said lower position between limits defined by said traverse stops, and compensating adjustment means cooperating with both of said traverse stops to vary the effective positions of said traverse stops an amount equal to the variation in the length of said sloping ends of the grooves at said different depths for cutting the same length of groove at said different depths.

13. A routing machine for removing defects from wood, comprising a table to support sheets of wood to be treated, a rotary routing tool having a horizontal axis for cutting elongated sloping-end grooves in said sheets, means supporting said tool above said table for movement between an upper position and a lower, defect-cutting position, adjustable stop means for limiting said movement to said lower position to cut grooves of different predetermined depths in said sheets, a pair of traverse stops, means for imparting traverse movement to said tool in said lower position between limits defined by said traverse stops, and adjustable shim elements cooperating with both of said traverse stops to vary the effective positions of said traverse stops an amount equal to the variation in the length of said sloping ends of the grooves at said different depths for cutting the same length of groove at said different depths.

14. In a routing machine for removing defects from a sheet of wood, a table to support sheets to be treated, an elongated housing having a chip breaker plate at one end to engage the top surface of a sheet on said table, a rotary routing tool in said housing mounted for vertical and traverse movements relative to the housing for cutting elongated sloping-end grooves in said sheets, said traverse movements comprising a cutting stroke beginning at said one end of the housing and a return stroke ending at said one end, adjustable stop means for limiting said vertical movement to cut grooves of different predetermined depths, a pair of traverse stops to limit the traverse movement of said tool, and compensating adjustment means cooperating with both of said traverse stops to vary the effective position of each stop by amounts equal to the variations in the lengths of the respective sloping ends of the grooves at said different depths to maintain a uniform length of groove at said different depths.

15. A routing machine for removing defects from wood, comprising a table to support sheets of wood to be treated, a rotary routing tool having a horizontal axis for cutting elongated sloping-end grooves in said sheets, means supporting said tool above said table for movement between an upper position and lower, defect-cutting position, adjustable stop means for limiting said movement to said lower position to cut grooves of different predetermined depths in said sheets, means for imparting traverse movement to said tool in said lower position, a series of traverse stops for limiting said traverse movement to cut said grooves to different predetermined lengths at one of said predetermined depths, and compensating adjustment means cooperating with said traverse stops to vary the traverse movements by increments equal to the variations in the lengths of said sloping ends of the grooves at said different depths to maintain said predetermined lengths of cut at said different depths.

16. A routing machine for removing defects from wood, comprising a table to support sheets of wood to be treated, a rotary routing tool having a horizontal axis for cutting elongated sloping-end grooves in said sheets, means supporting said tool above said table for movement between an upper position and lower, defect-cutting position, adjustable stop means for limiting said movement to said lower position to cut grooves of different predetermined depths in said sheets, a carriage supporting said tool for traverse movement in said lower position, a series of traverse stops for limiting said traverse movement to cut said grooves to different predetermined lengths at one of said predetermined depths, and compensating adjustment means on said carriage cooperating with said traverse stops to vary the traverse movements by increments equal to the variations in the lengths of said sloping ends of the grooves at said different depths to maintain said predetermined lengths of cut at said different depths.

17. A routing machine for removing defects from wood, comprising a table to support sheets of wood to be treated, a rotary routing tool having a horizontal axis for cutting elongated sloping-end grooves in said sheets, means supporting said tool above said table for movement between an upper position and lower, defect-cutting position, adjustable stop means for limiting said movement to said lower position to cut grooves of different predetermined depths in said sheets, a carriage supporting said tool for traverse movement in said lower position, a series of traverse stops for limiting said traverse movement to cut said grooves to different predetermined lengths at one of said predetermined depths, and shim elements mounted on the machine for interposition between said carriage and traverse stops to vary the traverse movements by increments equal to the variations in the lengths of said sloping ends of the grooves at said different depths to maintain said predetermined lengths of cut at said different depths.

18. In a routing machine for removing defects from wood, a table for supporting a sheet to be treated, an elongated housing having a chip breaker plate at one end thereof to engage said sheet, a rotary routing tool mounted for vertical and traverse movements relative to said housing, said traverse movements comprising a cutting stroke beginning at said chip breaker plate to cut elongated sloping-end grooves in said sheet, traverse stops defining the limits of said cutting stroke, means to rotate said cutting tool in an upward direction on the side adjacent said chip breaker plate, adjustable stop means for limiting the vertical movement of said tool to cut grooves of different predetermined depths in said sheets, and compensating adjustment means cooperating with said traverse stops to vary both end limits of said cutting stroke by amounts equal to the variations in the lengths of said sloping ends of the grooves at said different depths to maintain the same length of groove at said different depths.

19. A routing machine for removing defects from wood, comprising a table to support sheets of wood to be treated, a rotary routing tool having a horizontal axis for cutting elongated sloping-end grooves in said sheets, a housing enclosing said tool, a chip breaker plate on the bottom of said housing at one end thereof adapted to engage the top surface of a sheet on said table, means supporting said tool and housing for vertical movement, adjustable stop means for limiting the vertical movement of said tool to cut grooves of different predetermined depths in said sheets, means for imparting traverse movement to said tool relative to said housing, a first traverse stop defining a starting position of said traverse movement in a cutting stroke beginning at said chip breaker plate, means for rotating said tool in a direction to turn the side toward the chip breaker plate upwardly, additional traverse stops defining different lengths of cutting strokes, compensating adjustment means cooperating with said first traverse stop to vary the starting position of said tool by an amount equal to the variations in the lengths of the sloping end of said groove at said different depths, and compensating adjustment means cooperating with the other traverse stops to vary the end limit positions of the tool by amounts equal to the variations in the lengths of said sloping ends at said different depths to maintain uniformity in the lengths of the grooves at said different depths and to maintain said tool in the same position relative to said chip breaker plate at sarting position at said different depths.

ELBERT V. BENNETT.
HARRELL RENN.

References Cited in the file of this patent

UNITED STATES PATENTS

| Number | Name | Date |
|---|---|---|
| 547,455 | Schmidt | Oct. 8, 1895 |
| 881,064 | Favreau | Mar. 3, 1908 |
| 1,075,231 | Solem | Oct. 7, 1913 |
| 1,285,041 | Clark | Nov. 19, 1918 |
| 1,816,853 | Jayne | Aug. 4, 1931 |
| 1,956,911 | Tate | May 1, 1934 |
| 2,100,566 | Munding | Nov. 30, 1937 |
| 2,104,158 | Hedgpeth | Jan. 4, 1938 |
| 2,539,742 | Jacobson | Jan. 30, 1951 |